United States Patent
Krishnamoorthy et al.

(10) Patent No.: US 8,766,583 B1
(45) Date of Patent: *Jul. 1, 2014

(54) VOLTAGE MODE USING PSEUDO CURRENT LIMIT

(71) Applicant: Marvell International Ltd., Hamilton (BM)

(72) Inventors: Ravishanker Krishnamoorthy, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,569

(22) Filed: Mar. 4, 2013

Related U.S. Application Data

(63) Continuation of application No. 12/177,084, filed on Jul. 21, 2008, now Pat. No. 8,390,226.

(60) Provisional application No. 60/950,997, filed on Jul. 20, 2007.

(51) Int. Cl.
*G05B 11/28* (2006.01)

(52) U.S. Cl.
USPC ........................ 318/599; 318/811; 318/461

(58) Field of Classification Search
USPC .......... 318/461, 599, 811, 432; 388/800, 801, 388/815, 821; 360/75
See application file for complete search history.

(56) References Cited

U.S. PATENT DOCUMENTS

| | | | |
|---|---|---|---|
| 5,012,166 A | 4/1991 | Ushijima et al. | |
| 5,412,809 A * | 5/1995 | Tam et al. | 713/324 |
| 5,457,365 A | 10/1995 | Blagaila et al. | |
| 5,592,353 A | 1/1997 | Shinohara et al. | |
| 5,834,913 A * | 11/1998 | Yoshida et al. | 318/270 |
| 5,982,571 A | 11/1999 | Calfee et al. | |
| 6,144,526 A * | 11/2000 | Ginosar et al. | 360/133 |
| 6,271,980 B1 * | 8/2001 | Ginosar et al. | 360/75 |
| 6,295,261 B1 * | 9/2001 | Kim | 369/53.3 |
| 6,373,204 B1 | 4/2002 | Peterson et al. | |
| 6,967,458 B1 | 11/2005 | Bennett et al. | |
| 7,062,160 B2 | 6/2006 | Heydt et al. | |
| 7,334,854 B1 | 2/2008 | Chang et al. | |
| 2004/0012355 A1 | 1/2004 | Sosseh et al. | |

* cited by examiner

*Primary Examiner* — Rina Duda

(57) ABSTRACT

According to an aspect of the invention, an apparatus includes: a spindle motor; and circuitry configured to spin up the spindle motor by increasing a command voltage in small steps while monitoring a current flowing through the spindle motor. According to another aspect of the invention, a method includes: spinning up a spindle motor from a stationary state to a target speed using a voltage mode of operation for the spindle motor, wherein the spinning up includes supplying to the spindle motor a series of multiple discrete voltage levels ranging from a first voltage level to a second voltage level; and maintaining the spindle motor at the target speed.

14 Claims, 9 Drawing Sheets

VOLTAGE MODE USING PSEUDO CURRENT LIMIT

CROSS-REFERENCE TO RELATED APPLICATIONS

This application is a continuation application of (and claims the benefit of priority to) U.S. application Ser. No. 12/177,084, filed Jul. 21, 2008, and issuing on Mar. 5, 2013, as U.S. Pat. No. 8,390,226, which claims priority to U.S. Provisional Application Ser. No. 60/950,997, titled "METHOD TO SHORTEN SPIN UP TIME OF SPINDLE MOTOR IN A VOLTAGE MODE USING PSEUDO CURRENT LOOP," filed on Jul. 20, 2007, the disclosure of which is incorporated herein by reference in its entirety.

TECHNICAL FIELD

The subject matter of this application is generally related to electrical circuits.

BACKGROUND

Hard disk drives are commonly used as storage devices for storing and retrieving digital information. For example, some of the consumer products available in the current electronics market (e.g., portable music players and cellular phones) include internal hard disk drives each with a particular storage capacity designed to accommodate user data and functions. The digital information is usually read from or recorded onto a circular disk of a hard disk drive while rotating the disk about a spindle by a spindle motor. As the disk is spun at a particular rate, the servo mechanism of the hard disk drive moves across the disk surface and is positioned over a specific track to read out information recorded on the disk.

When power is initially applied to an electronic device supplied with a hard disk drive, the hard disk drive undergoes a "spin-up" process to bring the disk up to operating speed and to initialize a startup procedure. To conserve energy and improve power efficiency, the hard drive disk normally shuts down after detecting a period of non-use. At the next disk access, the spindle motor of the hard disk drive than spins up again and re-initializes the startup procedure.

Thus, the access time for retrieving and recording data from the hard disk drive can depend on how quickly the spin-up process can be completed by driving the spindle motor to a steady-state operating speed.

SUMMARY

Method, systems and computer program products for utilizing a pseudo-current mechanism to achieve a shortest spin-up time associated with a spindle motor for a given current (e.g., less than a maximum allowable current) are described. Specifically, a voltage mode with current limit may be implemented, which limits a current flowing through the spindle motor while incrementally increasing the voltage across the spindle motor. By continuously increasing the voltage across the spindle motor in small steps at specified time intervals while preventing the current from reaching beyond the current limit, short spin-up time and circuit simplicity may be achieved.

In some implementations, a method includes: determining a current limit associated with a spindle motor, supplying a voltage to the spindle motor to accelerate the spindle motor, monitoring a current flowing through the spindle motor as the spindle motor accelerates, comparing the current against the current limit, and increasing the voltage by a predetermined amount if the current does not exceed the current limit.

In some implementations, a method includes: accelerating a motor by applying a first voltage to the motor, monitoring a current flowing though the motor over a first period, comparing the current with a predetermined current limit to determine whether the current exceeds the predetermined current limit, and increasing the first voltage to a second voltage at end of the first period if the current is below the current limit.

In some implementations, a method includes: applying a first voltage across a motor to accelerate a motor over a predetermined number of time intervals, determining whether a current flowing through the motor decreases as the motor accelerates over a predetermined number of time intervals, and increasing the voltage by a predetermined voltage amount during each time interval if it is determined that the current is decreasing.

In some implementations, a method includes: receiving a predetermined current limit value, measuring a current flowing through a motor, and increasing a voltage applied to the motor if the current is less than the current limit value.

In some implementations, a method includes: initializing a disk drive having a spindle motor for rotating a disk, and ramping up a speed of the motor to spin up the disk to reach a predetermined speed, where ramping up the speed of the motor includes: applying a first voltage from a supply across windings of the motor, monitoring a current passing through the motor, and increasing the first voltage by a predetermined voltage amount if the current is below a current limit.

in some implementations, a system includes: a voice coil motor for actuating a head over a disk, a spindle motor for rotating the disk, the spindle motor including a plurality of windings, a host for determining a current limit, an interface for receiving a supply voltage from the host, a spindle driver for applying a voltage from the supply voltage to the windings of the spindle motor, a detection module for monitoring a current across the spindle motor, the current being generated by the applied voltage, and a control module for adjusting the applied voltage if the current is below the current limit.

The details of one or more embodiments of the invention are set forth in the accompanying drawings and the description below. Other features, objects, and advantages of the invention will be apparent from the description and drawings, and from the claims.

DETAILED DESCRIPTION

Hard Disk Drive System Overview

Figure 1:
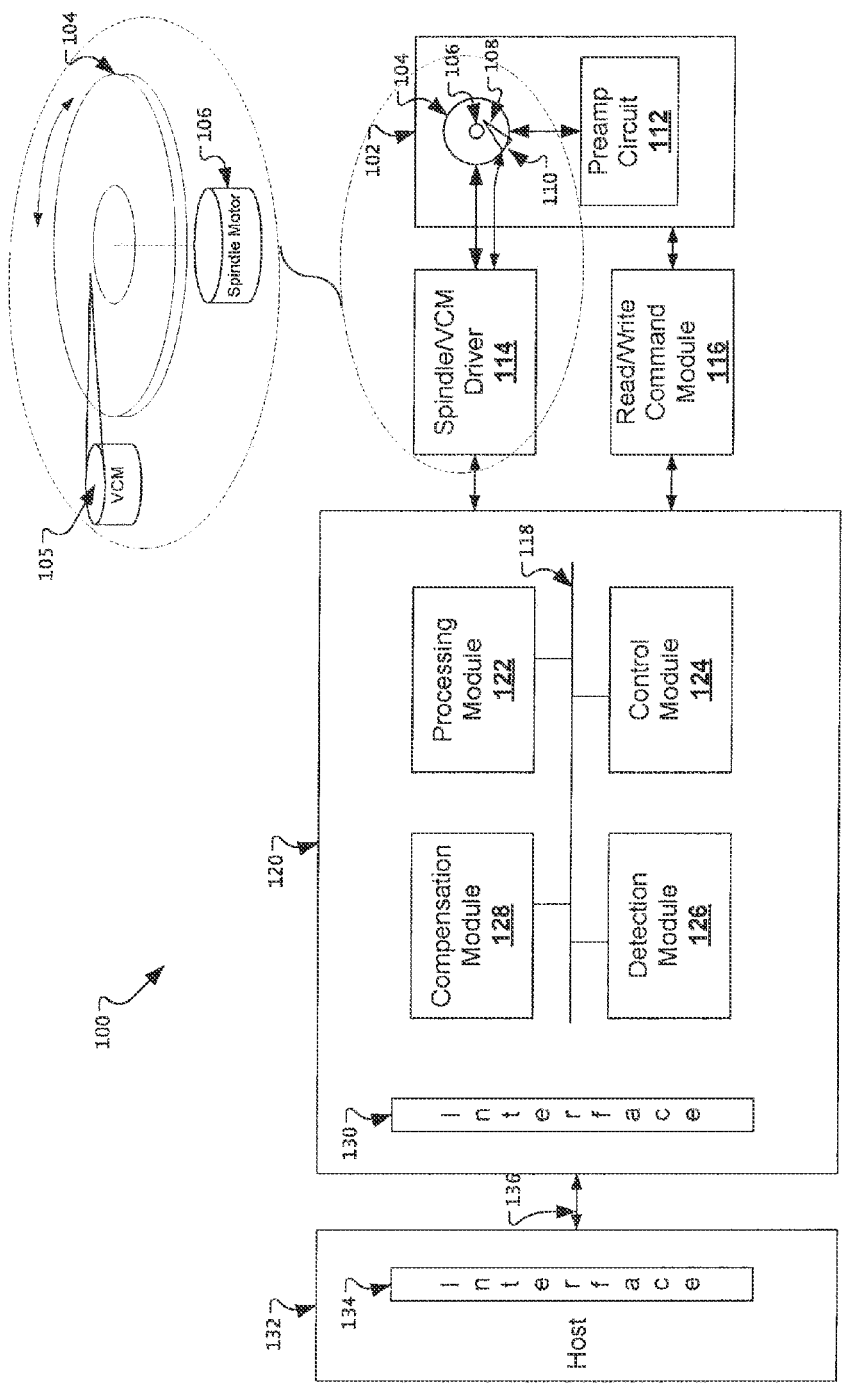
FIG. 1 shows an example hard disk drive (HDD) system.

FIG. 1 shows an example hard disk drive (HDD) system 100. As shown in FIG. 1, the HDD system 100 includes a printed circuit board (PCB) 120. The PCB 14 includes a processing module 122, a control module 124, a detection module 126, a compensation module 128 and a communications interface 130, each of which is connected through a bus 118.

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 may include volatile memory (e.g., be SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementation, the processing module 122 also may store various firmware routines for controlling the operation of the spindle motor 106 such s, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use. In other implementations, the spindle/VCM driver 114 may receive VCM control signals from the PWM controller and generate a corresponding command signal to command a voice coil motor (VCM) 105 for positioning the arm 110 and the read/write head 108, for example, as part of a parking operation. The voice coil motor 105 may be an element of a head-positioning servo system (not shown), and may be configured to apply torque to the read/write head 108 to swing the read/write head 108 during a track-seeking operation and to maintain the head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor 106. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide the zero crossing information to the processing module 122 to compute the velocity of the spindle motor 106.

The control module 124 may function to manage and handle data transfer between the PCB 120 and the host 132 during read and write operations through the communications interfaces 130/134. The control module 124 also may include servo logic for managing the positioning of the read/write head 108 when seeking (e.g., moving from one track to an adjacent or non-adjacent track) and during track following (e.g., staying on a single track).

The control module 124 may communicate with the communications interface (e.g., an input/output interface) 130 and with the spindle/VCM driver 114 or the read/write command module 116. The control module 124 may coordinate control of the spindle/VCM driver 114, the read/write command module 116, the processing module 122, the compensation module 128 and the detection module 126.

The control module 124 may receive a command from the host computer 132 to generate a spin-up command while the spindle motor 106 is at rest to begin the spin-up mode of operation. The processing module 122 may receive the spin-up command from the control module 124 and retrieve an associated control routine for the spin-up mode of operating from a memory unit.

During write operations, the read/write command module 116 may encode (e.g., using run length limited coding (RLL)) data to be written by the read/write head 108 and generate encoded write signals. The read/write command module 116 also may process the write signals providing a reliability check and may apply, for example, error correction coding (ECC) and similar algorithms to allow for the verification of the integrity of the data that is written. During read operations, the read/write head 108 may generate read signals (e.g., analog signals), and the read/write command module 116 may convert the read signals into digital read signals. The converted signals may e detected and decoded by conventional techniques to recover data written by the read/write head 108.

Hard Disk Drive Assembly

The HDD head assembly 102 may include one or more magnetic disks or platters 104 for storing magnetic data. The platters 104 may be rotated by a spindle motor 106. The spindle motor 106 may rotate the magnetic platters 104 as a controlled speed during the read/write operations. The read/write arm 110 may move relative to the magnetic platters 104 in order to read and/or write data to/from the magnetic platters 104. The spindle/VCM driver 114 may be configured to control the spindle motor 106, which rotates the magnetic platters 104. If desired, the spindle/VCM driver 114 also may generate control signals for positioning the read/write arm 110 using the voice coil actuator 105, a stepper motor or any other suitable actuator.

The read/write head 108 may be located near a distal end of the read/write arm 110. The read/write head 108 may include a write element (e.g., an inductor) that generates a magnetic field, and a read element (e.g., a magneto-resistive (MR) element) that senses the magnetic field on the magnetic platters 102.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information During a write operation, the preamp circuit 112 also may provide write current via a write data signal to a selected transducer for writing a sequence of symbols onto the magnetic platters 104. The write current changes polarity upon each change in the binary value of the write data signal.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

Spindle Motor

In some implementations, the spindle motor 106 may be constructed as a multi-phase motor (not shown). For example, the spindle motor 106 may be constructed as a brushless three-phase inductive motor. The three-phase motor may be constructed with a rotating magnet assembly (or spindle) and a stationary coil assembly (or stator). An alternating current may be supplied to the coils of the stator, and the spindle may be rotated by a force created by the alternating current.

The spindle motor 106 may include stationary elements (e.g., a stator) and rotatable elements (e.g., a rotor). The rotor may include a hub that supports each platter. The spindle motor 106 may include a bearing arrangement such as one or more sets of ball bearings so that the rotor may rotate about the stator. The stator may include electromechanical stator components including a stator core having core members that radiate away from the center of the core (or centertap) to define stator poles of the stator, and a set of stator wires (or windings) that are wound around the stator poles and interconnected in a predetermined configuration (e.g., a "Y" configuration). The rotor may include a set of permanent magnets that are arranged to define rotor poles of the rotor.

During operation, the rotation of the rotor causes each disk to spin (e.g., in either a forward-spin or reverse-spin direction). To accelerate the rotor to a normal operating spin rate and subsequently maintain the spin rate substantially constant, applied torque may be generated to overcome stiction and to oppose dynamic frictional forces. To generate the applied torque, current may be applied to one or more or the windings to generate a stator magnetic field. The magnitude of the electromagnetic field may vary and may depend upon the magnitude of the current flow. Similarly, the permanent magnets in the rotor may produce a rotor magnetic field. Various degree of torque can be produced when the stator magnetic field and the rotor magnetic field interact.

As discussed above, the spindle motor 106 may be implemented as a three-phase motor. In implementations in which a three-phase motor is used as the spindle motor 106, a current may be supplied to two of the three windings of the three-phase motor by applying a voltage between the terminals associated with the two windings and the centertap. The third terminal may be left floating such that the voltage seen on the third terminal is the voltage (e.g., a sinusoidal voltage) induced by the movement of the rotating magnets relative to the windings. Of course, other modes are possible. For example, current may flow through only a single winding between one of the winding terminals and the centertap, while no currents flows through either of the other two windings. As another example, current may flow through all three of the windings. Generally, a spin-up process may be performed by applying, for example, a DC voltage across a selected combination of the windings to generate a positive torque on the rotor to accelerate the spindle motor 106 to an operating spin-rate.

Given the three terminals and two polarities of current direction for each winding terminal, the current may be supplied to the windings in six different commutations (or states). The spindle motor 106 may be driven by sequencing through these six states repeatedly. For example, the spindle motor 106 may cycle from one commutation (e.g., where terminal "A" is driven by a high voltage and terminal "B" is allowed to float) to another commutation (e.g., where terminal "A" is now floating while terminal "B" is now driven by a high voltage).

In some implementations, a power supply voltage may be applied to the spindle motor 106 to induce the BEMF on one of the windings by the rotating permanent magnet of the rotor. In these implementations, the motor supply voltage may be a pulse-width modulated three-phase pulsed signal.

As will be discussed in greater detail below with respect to the spin-up process, BEMF signals may be used for controlling the acceleration of the spindle motor 106 up to a desired operating spin rate. Specifically, by detecting the BEMF signals including the voltage across the spindle motor 106 (e.g., voltage output from the motor and each of the winding terminal), the motor speed of the spindle motor 106 ma e accurately identified. The detected motor speed can subsequently be used to determine whether a steady-state operational speed has been reached and whether the motor spin-up process is complete. For example, the BEMF signals of the spindle motor 106 may be monitored by the detection module 126 and processed by the control module 124 to generate velocity feedback information (e.g., digital signals indicative of motor speed). Using the velocity feedback information, a corresponding motor speed may be identified. If the identified speed does not meet a predetermined threshold, as will be discussed in greater detail below, a motor voltage signal may be generated for controlling the voltage of the spindle motor 106, which modifies the speed and spin-up time of the spindle motor 106.

Processing Module

The processing module 122 may include a memory for storing programming codes to be executed by the processor. In some implementations, the processing module 122 may include a spindle speed controller (not shown) for maintaining accurate spindle speed control based on the velocity feedback signals monitored by the detection module 126, the control module 124, the spindle/VCM driver 114 and/or combinations thereof. In response to the velocity feedback signals, the spindle speed controller may adjust a commanded output current to correct for variations from the desired speed, and control the spindle motor's speed using the adjusted output current. If the available current is insufficient to maintain accurate control, the processing module 122 can increase the commutation phase advance to achieve the required current.

While the spindle speed controller is described as a component of the processing module 122, the spindle speed controller also can be a stand-alone component of component of one of the modules in the PCB 120 (e.g., control module 124).

The processing module 122 may control the commutation phase advance of the windings of the spindle motor 106 to generate substantially maximum torque if maximum torque is needed. Alternatively, if maximum torque is not needed, the processing module 122 may adjust the commutation phase advance to achieve optimal efficiency. This permits an optimal drive current to be delivered to the motor windings when increased torque output is desired, and otherwise to deliver the drive current needed for maximum efficiency.

Hard Disk Drive Initialization

As discussed above, the HDD head assembly 102 may rotate a disk at a target rate using the spindle motor 106 and perform a read/write operation using a magnetic head (e.g., the read/write head 108). When activated, the HDD head assembly 102 may initialize a series of startup operations such as spinning up the spindle motor 106 to a desired rotating speed/velocity and maintaining the rotating speed/velocity of the spindle motor 106 at a desired operating rate. Generally, the delay that the HDD head assembly 102 incurs during initialization is a function of the time lapse from the time of powering up the HDD head assembly 102 to the time when data can first be read from or written by the HDD head assembly 102.

When a disk drive is initialized (e.g., from a reset condition), the control module 124 may execute an initialization sequence to place the HDD head assembly 102 in an operational state. This initialization sequence may vary from disk drive to disk drive but generally involve initial tests (or start-up tests) of the various components or sub-systems of the HDD system 100, after appropriate parameters and commands have been loaded for use during the disk drive operations. The spindle motor 106 may continue to accelerate until a speed threshold sufficient to aerodynamically support the read/write head 108 over the magnetic platters 104 is met. After initialization is complete, the control module 124 may communicate with the host 132 to receive data transfer commands.

Generally, the initialization sequence is activated while the disk drive is at rest (e.g., when the disk platters 104 are not spinning). However, a momentary power drop in the HDD system 100 can cause a reset condition, and this reset condition may force the HDD system 100 to reinitialize even when the disk drive (e.g., the spindle motor 106 and the platters 104) is still spinning. Thus, in some implementations, it is desirable to determine whether the disk drive is actually spinning upon initialization, since the state of the spindle motor 106 may determine the appropriate manner in which drive signals are applied by the spindle/VCM driver 114 to accelerate the spindle motor 106 to the final desired operational velocity.

Spin-Up Process Overview

Generally, fast spin-rate (e.g., fast motor speed) can shorten the spin-up time required to bring the hard drive disk up to an operating speed before data can be accessed. Similarly, data transfer rates associated with read and write operations can be increased by increasing the spin-up rate of spindle motor 106. The faster the spindle motor 106 can be spun, the faster data can be written to or read from the magnetic platters 104. Typically, fast spin-up rates can be realized by utilizing bigger, faster spindle motors having larger windings and higher currents flowing through the windings.

Figure 2:
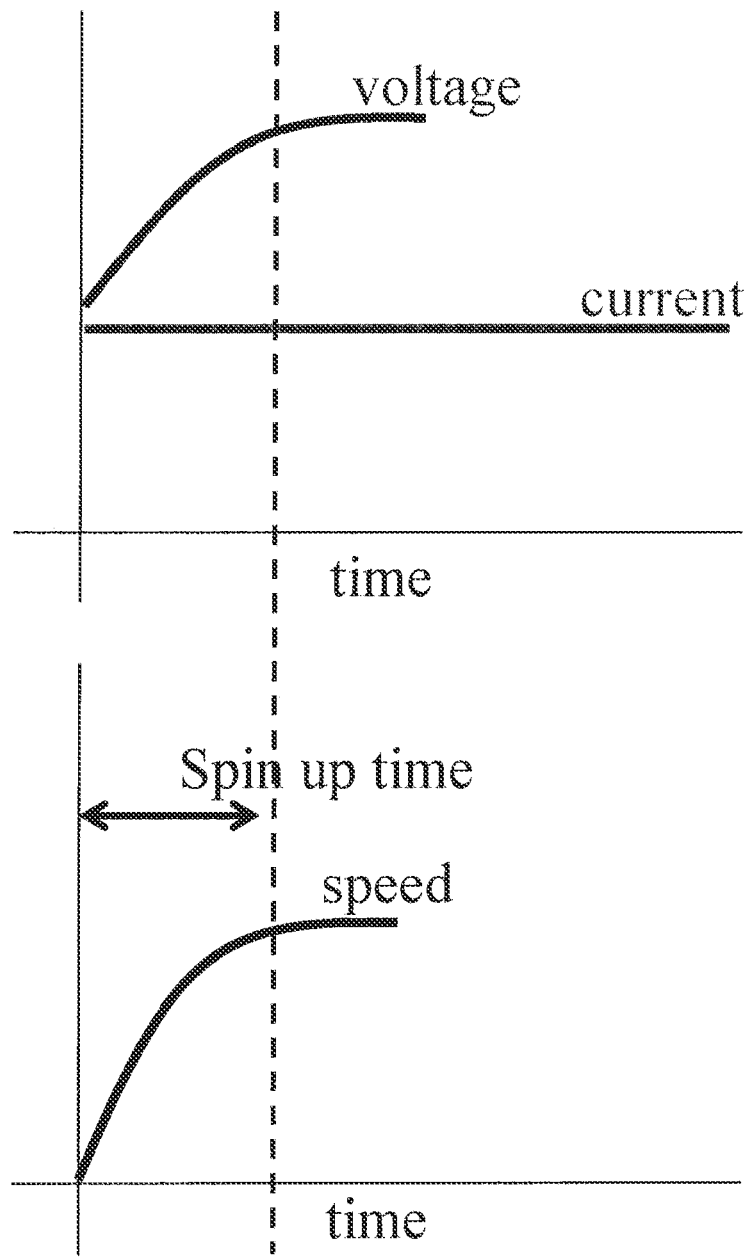
FIG. 2 is an example graph showing an inter-relationship between voltage, current, speed and spin up time of a spindle motor in a current control mode.

Increasing the size and speed of the spindle motor 106 places a greater demand on the HDD system 100 to control and maintain the speed of the motor 106. The HDD system 100 may, in some implementations, utilize current control to maintain the spin rate of the motor 106 at a substantially constant level by controlling the amount of current flowing through the spindle motor 106 and windings. In these implementations, the HDD system 100 may provide a constant current to the spindle motor 106 irrespective of the input power supply voltage and the BEMF induced by the spindle motor 106. FIG. 2 is an example graph showing an inter-relationship between the voltage, current, speed and spin up time of a spindle motor 106 in a current control mode.

Referring to FIG. 2, in a current control mode, as the speed of the spindle motor 106 increases, the current does not change, but is kept constant. In some implementations, maintaining a constant current flowing through the motor 106 may be realized by implementing the current control with current feedback. For example, the current feedback may include applying a voltage across the spindle motor 106, sensing the current through the spindle motor 106, generating feedback information indicative of a difference between the sensed current level and a desired current level, and adjusting the voltage across the spindle motor 106 based on the difference so that the current flowing through the motor 106 remains constant at the desired current level throughout the spin-up process.

As the HDD system 100 ramps up the motor speed, the motor speed induces an increase in BEMF and an increase in the voltage across the spindle motor 106. By monitoring the voltage across the spindle motor 106 and adjusting the current flowing through the spindle motor 106 as necessary, the spin rate can be maximized and spin-up time can be reduced without exceeding the current limit allowed by the HDD system 100 in the current control mode. With current control, the HDD system 100 also has greater control over writing data at a precise track and greater ability to avoid writing data over forbidden track areas, which can cause permanent damage to the platters and the dislikes.

Figure 3:
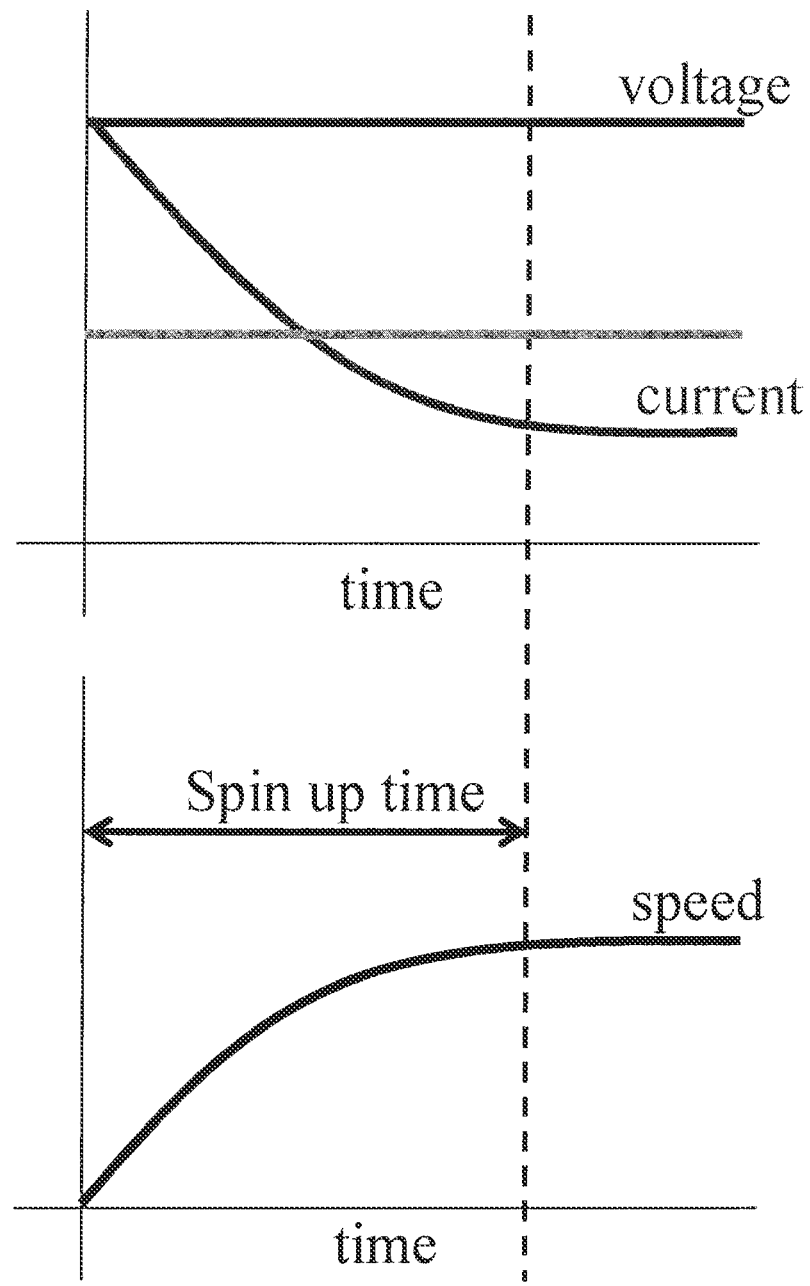
FIG. 3 is an example graph showing an inter-relationship between voltage, current, speed and spin up time of a spindle motor in a voltage control mode.

While current control can help reduce the spin-up time needed to drive the spindle motor 106 to a steady-state operating speed, current control techniques have stability and oscillation problems which can prevent the spindle motor 106 from being maintained at a steady-state operating speed. Overcoming stability and oscillation problems is possible, but such solutions often require additional complex circuits (e.g., since current control works only in a closed loop environment). The additions of complex circuits also can add to the overall complexity, cost and power consumption of the HDD system 100. Other hard disk performance benchmarks also may be compromised in exchange for guaranteed stability and maximum efficiency. To avoid the stability and oscillation problems associated with current control, the HDD system 100 may alternatively employ voltage control instead of current control. FIG. 3 is an example graph showing an inter-relationship between the voltage, current, speed and spin up time of a spindle motor 106 in a voltage control mode.

Referring to FIG. 3, when using voltage control, the voltage across the spindle motor 106 is kept constant. As the speed of the spindle motor 106 increases, the current through the spindle motor 106 decreases due to the applied force generated by the BEMF induced by the current. That is, on motor start-up, even when the mechanical power required is small, the current drawn from the power supply connected to the host 132 may still be very large. In voltage control mode, the current flowing through the spindle motor 106 depends on the speed and the BEMF. Unlike current control which requires current feedback and voltage adjustment for controlling the motor speed, voltage control does not require any feedback mechanism since voltage control can e implemented under an open loop setting.

In voltage control mode, the BEMF voltage may be used to provide an indication of the target speed of the spindle motor 106 (e.g., whether the spindle motor is operating above or below a maximum or minimum speed). Other measurement techniques also are possible. For example, if the spindle motor speed is below a given minimum speed, the BEMF signals may have a signal-to-noise ratio that is too weak to be detected. By ramping up the speed of the spindle motor 106 until a point at which the BEMF signals can be detected, the motor speed may readily be inferred. As another example, if the spindle motor speed is beyond a given maximum threshold, the BEMF signals may indicate a signal-to-noise ratio that exceeds a predetermined ratio. In this even, the speed of the spindle motor 106 may be ramped down until the signal-to-noise ratio meets the predetermined limit.

Because voltage feedback is not needed, voltage control offers circuit simplicity and cost savings to manufacturing inexpensive disk drives. One disadvantage of implementing voltage control, however, is the lengthy spin up time that the spindle motor 106 would need to complete the spin-up process. Since feedback circuits are not used in voltage control, the process for determining the precise motor speed is generally longer, which prolongs the overall spin-up process.

Thus, in some implementations, a voltage control mode utilizing a pseudo-current mechanism may be used to achieve a shortest spin-up time for a given current (e.g., less than a maximum allowable current). Specifically, a voltage mode with current limit may be implemented, which limits the current flowing through the spindle motor 106 while incrementally increasing the voltage across the spindle motor 106. By continuously increasing the voltage across the spindle motor 106 in small steps at specified time intervals while preventing the current from reaching beyond the current limit, this technique may yield short spin-up time and circuit simplicity without encountering stability and oscillation issues associated with current control.

Pseudo Current Limit

Figure 4:
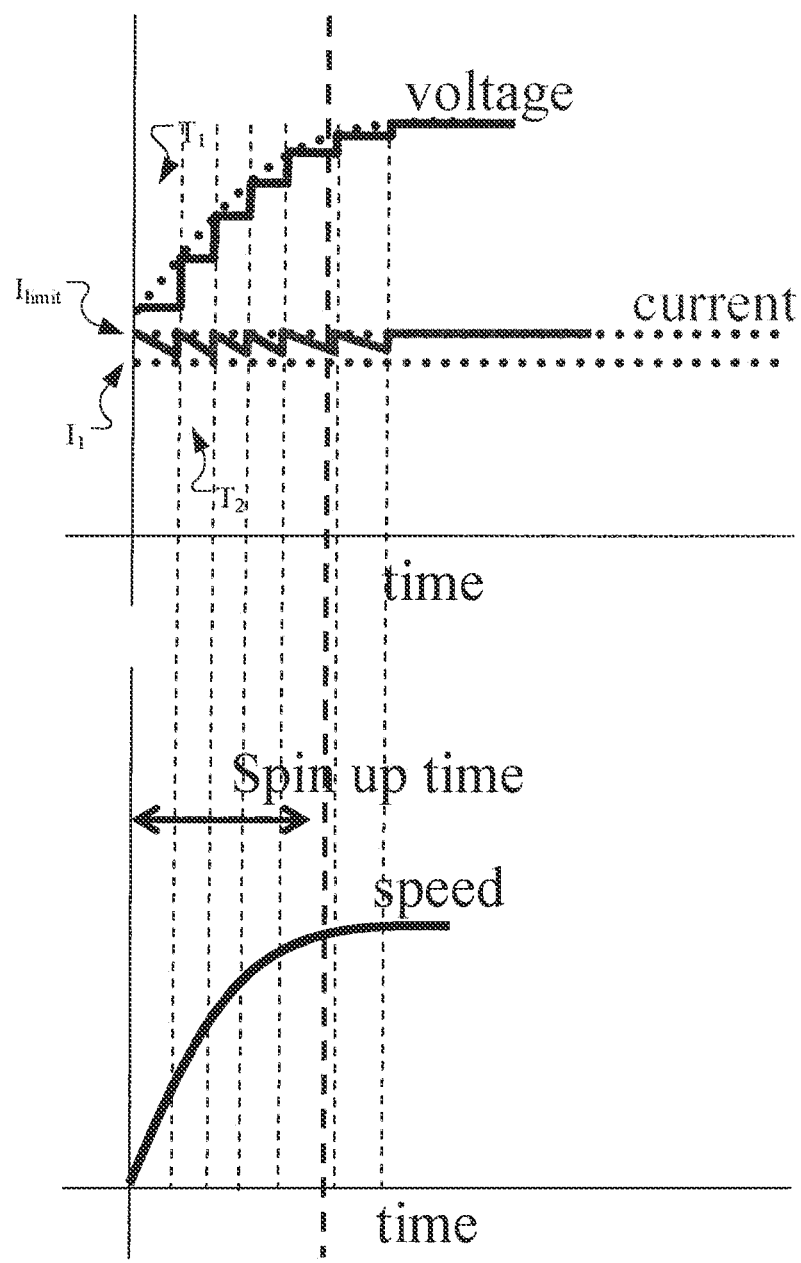
FIG. 4 is an example graph showing voltage, current and speed associated with a spindle motor over time in a pseudo current control mode.

During a spin up process, it may be desirable to accelerate the spindle motor 106 as fast as possible without exceeding the current limitations imposed by the host 132 on the supply voltage. Typically, at the beginning of the spin up process, the motor speed is relatively low, which means that the BEMF voltage in the windings of the spindle motor also is low but the peak current is high (e.g., where the current is operating at a current limit). The current through the spindle motor 106, together with the voltage across the spindle motor 106, may be used to define the maximum power that may be delivered to the spindle motor 106. FIG. 4 is an example graph of voltage, current and speed versus time in a pseudo current control mode.

As shown in FIG. 4, at the beginning of the first time interval $T_1$, the spindle motor 106 is switching from an idle state to an active state. As the spindle motor 106 begins to accelerate, the BEMF voltage in the windings of the spindle motor 106 also increases to thereby lower the peak current drawn by the windings of the spindle motor 106 (e.g., from current limit $I_{limit}$ to current level $I_1$). That is, the spindle motor 106 operates at optimal efficiency until the spindle motor 106 reaches a speed at which the available current (i.e., actual current) drops below the commanded current.

As already discussed, the decrease in the amount of available current is due to the increase in magnitude of the BEMF as speed increased, which in turn diminishes the voltage headroom margin. The voltage headroom indicates the amount of current that can be supplied to the spindle motor 106 for a given supply voltage, and robust speed control generally demands sufficient voltage headroom. When the voltage headroom margin is fully exhausted (e.g., as detected by the detection module 126), a current limiting speed (i.e., speed beyond which the power supply cannot deliver the current commanded by the spindle/VCM driver 114) has been reached. This is due to the fact that the BEMF increases with motor speed, and limits the available drive current due to the limited voltage headroom. After this point in the acceleration profile, the available current will continue to decrease during the first interval $T_1$ until it reaches the current level $I_1$ (which occurs at the conclusion of the first interval $T_1$).

At this time, sensing that the current flowing through the spindle motor 106 is below the current limit $I_{limit}$ (as detected by, for example, the detection module 26), which indicates the availability of extra voltage headroom, the compensation module 128 may determine an actual difference between the available current and the current limit. Based on the actual difference, the compensation module 128 can instruct the spindle/VCM driver 114 to increment the voltage across the spindle motor 106 by a predetermined amount corresponding to the actual difference (e.g., $I_{limits}$-$I_1$). this voltage increment provides a boost to current acceleration speed, which shortens the spin-up time to reach the target speed.

In some implementations, the voltage to be increased also may be based upon various parameters such as the type of the spindle motor 106. As an example, if the spindle motor 106 is a single platter low inertia motor, which has a high acceleration profile, then the rate of development of the BEMF may be rapid. In this example, the voltage increment may then be set higher to further minimize the spin-up time.

If desired, the process as described above may repeat again to further improve the spin-up time. For example, as the motor speed again increases, so does BEMF, which again lowers the peak current drawn by the windings of the spindle motor 106. Low current creates additional voltage headroom, which allows the compensation module 128 to increase the voltage across the spindle motor 106. This voltage increase also increases the current flowing through the spindle motor 106. By increasing the command voltage in small steps while monitoring the current, the HDD system 100 insures that the motor speed is optimized and the current does not exceed the current limit at any given time interval as a result of the speed increase. By operating the spindle motor 106 at the maximum speed in each time interval, the overall spin-up time of the spin-up process is significantly shortened. Once the command speed is achieved, the voltage may be held constant to thereby also keep the voltage and speed constant, resulting in stability and efficiency.

During the spin up process, other components of the HDD system 100 may draw more current from the supply voltage than anticipated. Fluctuations in the supply voltage also can cause fluctuations in the spindle motor speed during the spin up process. Once the disk reaches its steady state operating speed, the fluctuations become more pronounced, as it is important to spin the disk as a nearly constant angular velocity so as not to adversely affect the normal operating mode of the disk drive while writing data to or reading data from the disk.

Thus, in some implementations, the detection module 126 may monitor the power supply voltage on a periodic basis fro possible fluctuation, and forward any detected fluctuation information to the compensation module 128. The compensation module 128 may then generate appropriate control signals to the processing module 122, and the processing module 122 may subsequently control the spindle/VCM driver 114 and the spindle motor 106 based on the control signals so as to properly compensate for the fluctuations. This compensation process helps to maintain the total current as a desired value, and avoids exceeding the current limitations of the supply voltage while ensuring that the spindle motor 106 is driven with the maximum available current and speed during the spin up and steady state process. The pseudo current control allows the spindle motor 106 to be operated using voltage control while obtaining performance parameters similar to those associated with current control. Because current feedback is not required, complicated circuits and high manufacturing cost can be avoided. Voltage control using pseudo current limit reduce the spin-up time to complete the spin-up process, allowing the hard disk drive to be powered off more frequently without the burden of long re-initialization process.

Although not shown, the PCB 120 also may include digital logic circuits, a digital-analog converter (DAC), and a multiplier. The digital logic circuits may use signals representative of the current limit at the output, and provide adjustment values for adjusting the input of the DAC, which operates to control the voltage level of the drivers (e.g., spindle/VCM 114) in the pseudo current mode. The analog values there may be fed to the multiplier to be processed (e.g., by multiplying the analog values with profile input), the result of which may be used to drive the drivers for controlling the spindle motor 1060.

Exemplary Processes

Figure 5:
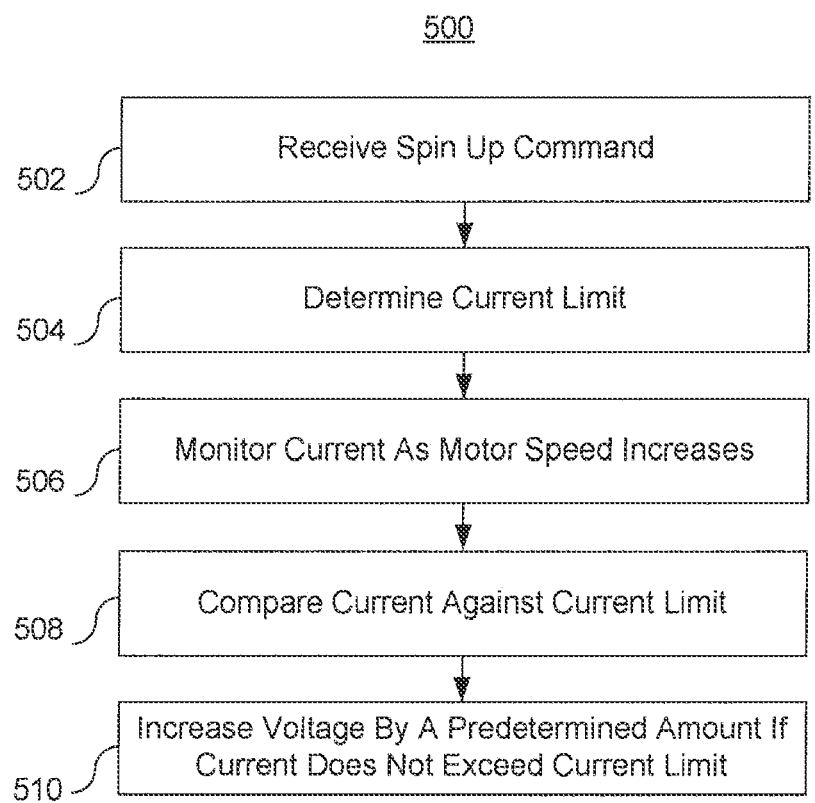
FIG. 5 is a flow diagram showing an example of a spin up process utilizing pseudo current limit.

FIG. 5 is a flow diagram showing an example of a spin up process 500 utilizing pseudo current limit. The process 500 may be performed, for example, by the HDD system 100, and for clarity of presentation, the description that follows uses the, HDD system 100 as the basis of examples for describing the process 500. However, another system, or combination of systems, may be used to perform the process 500.

As shown, the process 500 begins with receiving a spin up command (502). In some implementations, the spin up command may be received from a host. In these implementations, the host may be connected to a power supply which supplies, for example a DC voltage or AC current to the PCB 120 (e.g., through bus 136). The host also may provide clock signals for executing instructions relating to the operations of the HDD PCB 120 and HDD head assembly 102.

The command from the host may contain instructions for commanding a processing module (e.g., processing module 122)(and/or the spindle/VCM driver 114) to initiate a spin-up process. In some implementations, the instructions may include startup instructions identifying, for example, servo track error tolerance, power consumption commands and the like.

The host further may provide instructions for activating or deactivating the HDD system 100. For example, the host may initiate a standby mode. The standby mode may be invoked after a period of inactivity (e.g., after 1 minute), or upon a user's command. During the standby mode, the host may deactivate the HDD PCB 120 and the HDD head assembly 102 to conserve power. For example, the spindle motor 106 may be deactivated and the read/write head 108 may be lifted (e.g., by an actuator) to be parked outside of the magnetic platters 104 onto a nearby ramp. The HDD system 100 may be resumed or activated upon an event such as, without limitation, receiving a command from the host to initiate a spin up process as discussed with respect to operation 502. Upon receiving a spin-up command, the HDD system 100 exists out of the standby mode and resumes a normal mode of operation. For example, upon receiving a spin-up command, the spindle motor 106 may be activated and the read/write head 108 may be lifted to be moved from the ramp to the magnetic platters 104.

Once a spin up command is received, the process 500 proceeds with determining a current limit (504). In some implementations, the current limit may be set by The host 132 to prevent, for example, potential current overshoot that could damage the HDD system 100, to maintain consistency with a load that the host is designed to accommodate or to maximize the performance of the HDD system 100. The current limiting information may be received together with the startup instructions from the host 132. The current limiting information may be detected by the host by continuously or periodically monitoring various performance and operational drive parameters and empirically determining a suitable current limit for the HDD system 100.

In some implementations, the current limiting information may vary from applications to applications. For example, in mobile-type applications where mobile devices require fast spin-up time but low current consumption for maximizing battery life, the host may attempt to output a suitable current limit that strikes a balance between the spin-up time and power conservation. As another example, for desktop or enterprise applications where power conservation is not an important issue, the host may set a maximum current limit to allow for optimum spin-up time.

Next, process 500 includes monitoring the current as the motor speed increases (506). In some implementations, the current flowing through the spindle motor 106 may be monitored on a continuous basis as the spindle motor 106 increases in speed. In other implementations, the current may be monitored at specified fixed time intervals, and the voltage across the spindle motor 106 may be adjusted at each time interval. In these implementations, the voltage may be modified consistent with the current limit determined at operation 504 to ensure that the current drawn from the power supply has not exceeded the current limit. To do so, the current being drawn may be compared against the current limit as determined at operation 504 (508). If it is determined that the current has not exceeded the current limit, then the voltage may be increased by a predetermined amount (510).

As already discussed, the current drawn from the power supply may decrease during motor acceleration due to the BEMF induced in the windings. Thus, in some implementations, if the current falls below a predetermined threshold, the voltage may be increased until the time at which the current is substantially at or exceeds the current limit. In other implementations, the voltage may be adjusted regardless of the threshold (e.g., so long as the current is less than the current limit).

Process 500 adapts voltage adjustment in accordance with the current limit, and allows a current control loop to be approximated without being subject to issues associated with additional circuits and complexities as a result of such additional circuits. In effect, process 500 shortens the spin-up time by allowing the spindle motor to reach a target speed similar to that offered by current control without modifying the HDD system 100 to include any current control loop. In some implementations, the accuracy and closeness to the real current control loop may depend on the frequency of adjusting the voltage command and the accuracy of the current limit information provided by either the host 132 or the detection circuit 126.

In some implementations, operations 502-510 may be performed in the order listed, in parallel (e.g., by the same or a different process, substantially or otherwise non-serially), or in reverse order to achieve the same result. In other implementations, operations 502-510 may be performed out of the order show. The order in which the operations are performed may depend, at least in part, on what entity performs the method. For example, process 500 may determine the current limit prior to receiving a spin-up command. Operations 502-510 also may be performed by the same or different entities or systems.

Example Implementations

Figure 6:
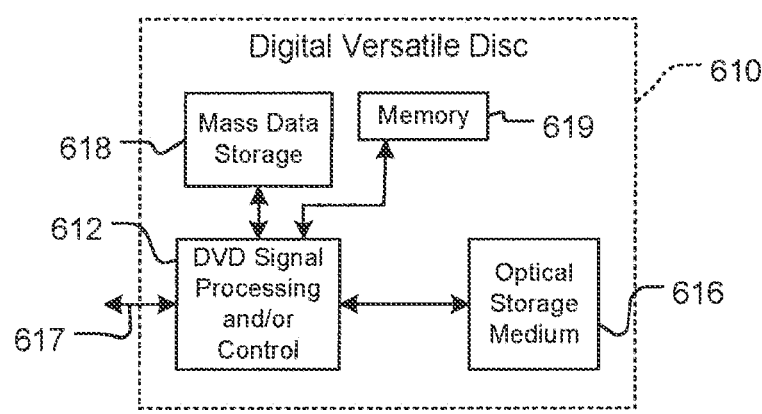
FIGS. 6-11 show various electronics implementing a hard disk drive system.

Referring now to FIG. 6, the described systems and techniques can be implemented in a digital versatile disc (DVD) drive 600. The described systems and techniques may be implemented in either or both signal processing and/or control circuits, which are generally identified in FIG. 6 as 612, and/or mass data storage of the DVD drive 610. The signal processing and/or control circuit 612 and/or other circuits (not shown) in the DVD 610 may process data, perform coding and/or encryption, perform calculations, and/or format data that is read from and/or data written to an optical storage medium 616. In some implementations, the signal processing and/or control circuit 612 and/or other circuits (not shown) in the DVD 610 can also perform other functions such as encoding and/or decoding and/or any other signal processing functions associated with a DVD drive.

The DVD drive 610 may communicate with an output device (not shown) such as a computer, television or other device via one or more wired or wireless communication links 617. The DVD 610 may communicate with mass data storage 618 that stores data in a nonvolatile manner. The mass data storage 619 may include a hard disk drive (HDD). The HDD may be a mini HDD that includes one or more platters having a diameter that is smaller than approximately 1.8". The DVD 610 may be connected to memory 619 such as RAM, ROM, low latency nonvolatile memory such as flash memory and/or other suitable electronic data storage.

Figure 7:
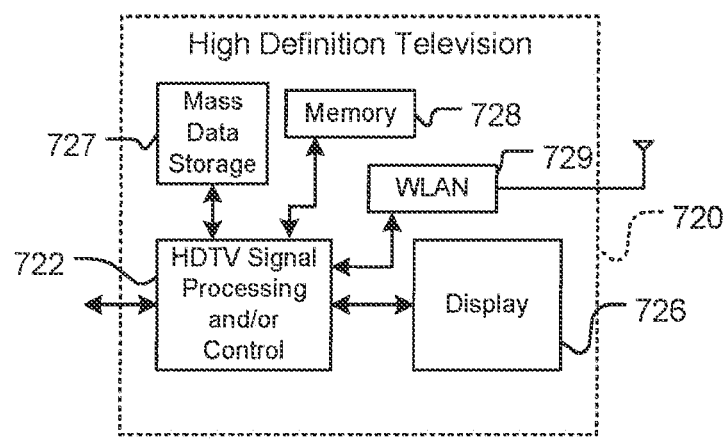

Referring now to FIG. 7, the described systems and techniques can be implemented in a high definition television (HDTV) 720. The described systems and techniques may be implemented in either or both signal processing and/or control circuits, which are generally identified in FIG. 7 as 722, a WLAN interface and/or mass data storage of the HDTV 720. The HDTV 720 receives HDTV input signals in either a wired or wireless format and generates HDTV output signals for a display 726. In some implementations, signal processing circuit and/or control circuit 722 and/or other circuits (not shown) of the HDTV 720 may process data, perform coding and/or encryption, perform calculations, format data and/or perform any other type of HDTV processing that may be required.

The HDTV 720 may communicate with mass data storage 727 that stores data in a nonvolatile manner such as optical and/or magnetic storage devices. At least one DVD may have the configuration shown in FIG. 6. The HDD may be a mini HDD that includes one or more platters having a diameter that is smaller than approximately 1.8". The HDTV 720 may be connected to memory 728 such as RAM, ROM, low latency nonvolatile memory such as flash memory and/or other suitable electronic data storage. The HDTV 720 also may support connections with a WLAN via a WLAN network interface 729.

Figure 8:
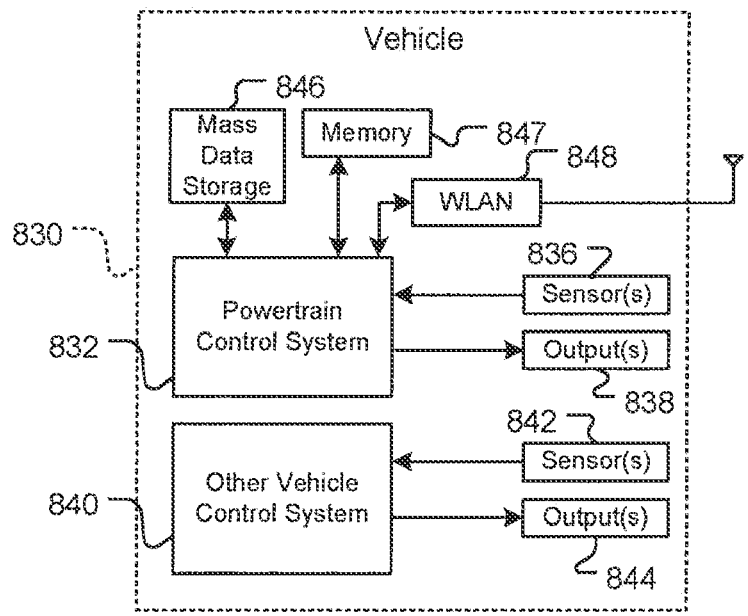

Referring now to FIG. 8, the described systems and techniques may be implemented in a control system of a vehicle 820, a WLAN interface and/or mass data storage of the vehicle control system. In some implementations, the described systems and techniques may be implemented in a powertrain control system 832 that receives inputs from one or more sensors 836 such as temperature sensors, pressure sensors, rotational sensors, airflow sensors and/or any other suitable sensors and/or that generates one or more output control signals such as engine operating parameters, transmission operating parameters, and/or other control signals to one or more output devices 838.

The described systems and techniques may also be implemented in other control systems 840 of the vehicle 830. The control system 840 may likewise receive signals from input sensors 842 and/or output control signals to one or more out devices 844. In some implementations, the control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 832 may communicate with mass data storage 846 that stores data in a nonvolatile manner. The mass data storage 846 may include optical and/or magnetic storage devices for example hard disk drives HDD and/or DVDs. At least one DVD may have the configuration shown in FIG. 6. The HDD may be a mini HDD that includes one or more platters having a diameter that is smaller than approximately 1.8". The powertrain control system 832 may be connected to memory 847 such as RAM, ROM, low latency nonvolatile memory such as flash memory and/or other suitable electronic data storage. The powertrain control system 832 also may support connections with a WLAN via a WLAN network interface 848. The control system 840 may also include mass data storage, memory and/or a WLAN interface (all not shown).

Figure 9:
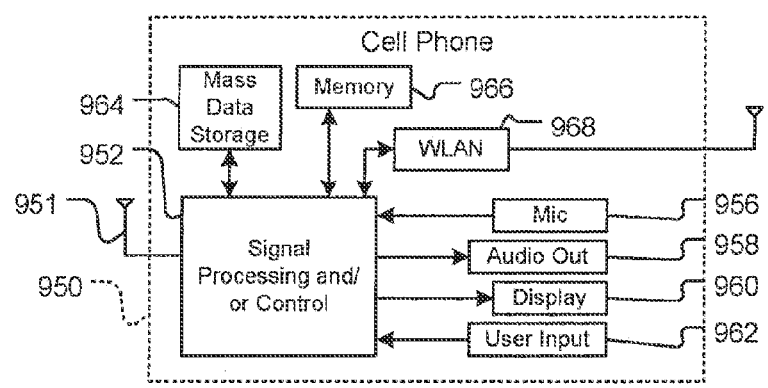

Referring now to FIG. 9, the described systems and techniques can be implemented in a cellular phone 450 that may include a cellular antenna 951. The described control circuits, which are generally identified in FIG. 9 as 962, a WLAN interface and/or mass data storage of the cellular phone 950. In some implementations the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone function.

The cellular phone 950 may communicate with mass data storage 964 that stores data in a nonvolatile manner such as optical and/or magnetic storage devices for example hard disk drives HDD and/or DVDs. At least one DVD may have the configuration shown in FIG. 6. The HDD may be a mini HDD that includes one or more platters having a diameter that is smaller than approximately 1.8". The cellular phone 950 may be connected to memory 966 such as RAM, ROM, low latency nonvolatile memory such as flash memory and/or other suitable electronic data storage. The cellular phone 950 also may support connections with a WLAN via a WLAN network interface 968.

Figure 10:
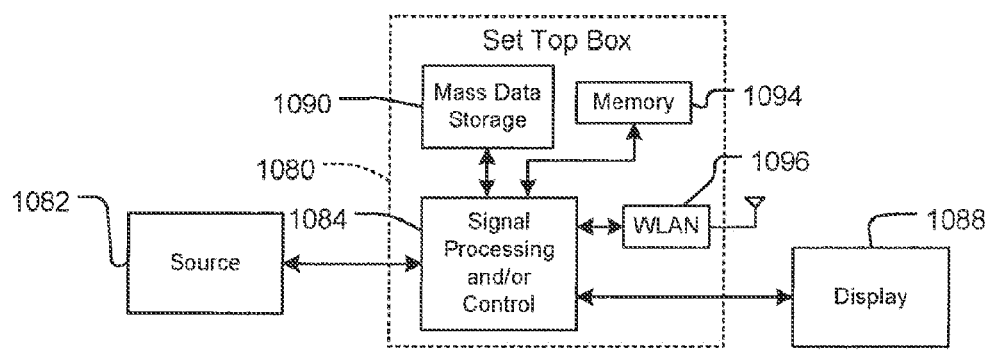

Referring now to FIG. 10, the described system and techniques can be implemented in a set top box 1080. The described systems and techniques may be implemented in either or both signal processing and/or control circuits, which are generally identified in FIG. 10 as 1084, a WLAN interface and/or mass data storage of the set top box 1080. The set top box 1080 receives signals from a source 1082 such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. At least one DVD may have the configuration shown in FIG. 6. The HDD may be a mini HDD that includes one or more platters having a diameter that is smaller approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 11:
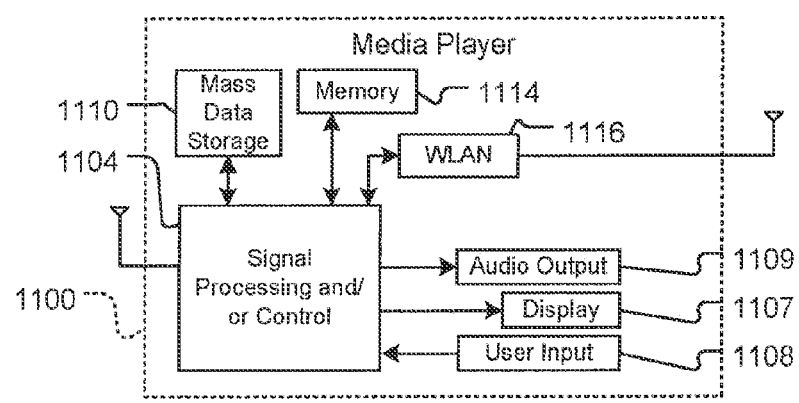

Referring now to FIG. 11, the described systems and techniques can be implemented in a media player 500. The described systems and techniques may be implemented in either or both signal processing and/or control circuits, which are generally identified in FIG. 11 as 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 (Moving Picture experts group audio lay 3) format or other suitable compressed audio and/or video formats. The mass data storage may include optical and/or magnetic storage devices for example hard disk drives HDD and/ or DVDs. At least one DVD may have the configuration shown in FIG. 6. The HDD may be a mini HDD that includes one or more platter having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sited and interconnected by a communication network.

While this specification contains many specifies, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system component in the embodiments described above should not be understood as requiring such separation in all embodiments.

What is claimed is:

1. A method comprising:
spinning up a spindle motor from a stationary state to a target speed using a voltage mode of operation for the spindle motor, wherein the spinning up comprises supplying to the spindle motor a series of multiple discrete voltage levels ranging from a first voltage level to a second voltage level; and
maintaining the spindle motor at the target speed;
wherein supplying to the spindle motor the series of multiple discrete voltage levels comprises incrementing a voltage supplied to the spindle motor in accordance with a difference between a current limit and a sensed current flowing through the spindle motor.

2. The method of claim 1, wherein the spinning up comprises:

supplying the first voltage level to the spindle motor, subject to a current limit; and incrementally increasing a voltage supplied to the spindle motor, subject to the current limit.

3. The method of claim 2, comprising receiving the current limit together with a startup instruction from a host associated with the spindle motor.

4. The method of claim 1, wherein supplying to the spindle motor the series of multiple discrete voltage levels comprises increasing a voltage supplied to the spindle motor at specified time intervals.

5. The method of claim 1, comprising monitoring a current flowing through the spindle motor, wherein supplying to the spindle motor the series of multiple discrete voltage levels comprises increasing a voltage supplied to the spindle motor in accordance with the monitored current.

6. The method of claim 1, wherein supplying to the spindle motor the series of multiple discrete voltage levels comprises incrementing a voltage supplied to the spindle motor by an amount based at least in part upon one or more parameters associated with an identified type of the spindle motor.

7. The method of claim 1, wherein the voltage mode of operation is a first voltage mode of operation, and the maintaining comprises using a second voltage mode of operation that is different from the first voltage mode of operation.

8. The method of claim 1, comprising:
   determining a current associated with maintaining the spindle motor at the target speed;
   monitoring fluctuations in power supply voltage; and
   adjusting the current associated with maintaining the spindle motor at the target speed to compensate for the fluctuations.

9. A computer-readable medium having instructions stored thereon, which, when executed by a processor, causes the processor to perform operations comprising:
   spinning up a spindle motor from a stationary state to a target speed using a voltage mode of operation for the spindle motor, wherein the spinning up comprises supplying to the spindle motor a series of multiple discrete voltage levels ranging from a first voltage level to a second voltage level; and
   maintaining the spindle motor at the target speed;
   wherein supplying to the spindle motor the series of multiple discrete voltage levels comprises incrementing a voltage supplied to the spindle motor in accordance with a difference between a current limit and a sensed current flowing through the spindle motor.

10. The computer-readable medium of claim 9, wherein the spinning up comprises:
    supplying the first voltage level to the spindle motor, subject to a current limit; and
    incrementally increasing a voltage supplied to the spindle motor, subject to the current limit.

11. The computer-readable medium of claim 9, wherein supplying to the spindle motor the series of multiple discrete voltage levels comprises increasing a voltage supplied to the spindle motor at specified time intervals.

12. The computer-readable medium of claim 9, the operations comprising monitoring a current flowing through the spindle motor, wherein supplying to the spindle motor the series of multiple discrete voltage levels comprises increasing a voltage supplied to the spindle motor in accordance with the monitored current.

13. The computer-readable medium of claim 9, wherein supplying to the spindle motor the series of multiple discrete voltage levels comprises incrementing a voltage supplied to the spindle motor by an amount based at least in part upon one or more parameters associated with an identified type of the spindle motor.

14. The computer-readable medium of claim 9, wherein the voltage mode of operation is a first voltage mode of operation, and the maintaining comprises using a second voltage mode of operation that is different from the first voltage mode of operation.

\* \* \* \* \*